US012720283B2

(12) United States Patent
Guo et al.

(10) Patent No.: US 12,720,283 B2
(45) Date of Patent: Aug. 25, 2026

(54) SENSOR DATA SHARING REDUNDANCY MITIGATION TECHNIQUES

(71) Applicant: QUALCOMM Incorporated, San Diego, CA (US)

(72) Inventors: Hui Guo, Beijing (CN); Dan Vassilovski, Del Mar, CA (US); Gene Wesley Marsh, San Diego, CA (US); Tien Viet Nguyen, Bridgewater, NJ (US); Lan Yu, Beijing (CN); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 18/580,377

(22) PCT Filed: Aug. 19, 2021

(86) PCT No.: PCT/CN2021/113457
§ 371 (c)(1),
(2) Date: Jan. 18, 2024

(87) PCT Pub. No.: WO2023/019502
PCT Pub. Date: Feb. 23, 2023

(65) Prior Publication Data

US 2024/0349022 A1 Oct. 17, 2024

(51) Int. Cl.
*H04W 4/46* (2018.01)
*H04W 4/12* (2009.01)
*H04W 4/38* (2018.01)
*H04W 92/18* (2009.01)

(52) U.S. Cl.
CPC ............... *H04W 4/38* (2018.02); *H04W 4/12* (2013.01); *H04W 92/18* (2013.01)

(58) Field of Classification Search
CPC ....... G08G 1/096791; G08G 1/096725; G08G 1/096741; H04W 4/46; H04W 4/38; H04W 4/12; H04W 92/18
See application file for complete search history.

(56) References Cited

U.S. PATENT DOCUMENTS

| | | | |
|---|---|---|---|
| 10,178,531 B2 | 1/2019 | Nguyen et al. | |
| 10,360,797 B2 | 7/2019 | Baghel et al. | |
| 2022/0217513 A1* | 7/2022 | Back | H04W 4/021 |

FOREIGN PATENT DOCUMENTS

| | | |
|---|---|---|
| WO | 2018052749 | 3/2018 |
| WO | 2018140191 | 8/2018 |

(Continued)

OTHER PUBLICATIONS

ETSI TR 103 562: "Intelligent Transport Systems (ITS), Vehicular Communications, Basic Set of Applications, Analysis of the Collective Perception Service (CPS), Release 2", ETSI Technical Report, European Telecommunications Standards Institute (ETSI), 650, Route Des Lucioles, F-06921 Sophia-Antipolis Cedex, France, vol. ITS WG1, No. V2.1.1,Dec. 18, 2019, pp. 1-119, XP014360260, Sections 1, 4.1.1, 4.3, and 4.5, paragraphs [4.1.2], [4.1.3], [4.1.4.2], [4.1.4.3], [4.3.4], [4.3.5], [04.5], paragraphs [5.3.3.4], [05.4], [5.5.1.2], [5.5.1.3].

(Continued)

*Primary Examiner* — Said M Elnoubi
(74) *Attorney, Agent, or Firm* — Patterson + Sheridan

(57) ABSTRACT

Aspects of the disclosure provide techniques for applying redundancy mitigation rules when transmitting sensor data sharing messages. A method, performed by a sidelink user equipment (UE), includes observing, via one or more sensors, a set of objects in an environment in which the sidelink UE is operating, applying one or more redundancy mitigation rules to the set of objects, determining, from the set of objects, a number of objects to be shared with one or more (Continued)

other sidelink UEs after the one or more redundancy mitigation rules have been applied to the set of objects, determining, based on the determined number of objects to be shared, whether to transmit a sensor data sharing message (SDSM) to the one or more other sidelink UEs indicating the objects to be shared from the set of objects, and taking one or more actions based on the determination of whether to transmit the SDSM.

30 Claims, 7 Drawing Sheets

(56) References Cited

FOREIGN PATENT DOCUMENTS

| | | | | | |
|---|---|---|---|---|---|
| WO | WO-2020257642 | A1 * | 12/2020 | ............. | H04W 4/12 |
| WO | 2021155570 | A1 | 8/2021 | | |

OTHER PUBLICATIONS

International Search Report and Written Opinion—PCT/CN2021/113457—ISA/EPO—May 18, 2022.

Qualcomm Incorporated: "FS_mV2X—Sensor Sharing of Object Information", 3GPP SA4#99 Meeting, Tdoc S4-180676, Jul. 9-13, 2018, Rome, Italy, the Whole Document, 4 Pages, the whole document.

Supplementary European Search Report—EP219537495—Search Authority—Munich—Mar. 20, 2025.

Thandavarayan G., et al., "Generation of Cooperative Perception Messages for Connected and Automated Vehicles", IEEE Transactions on Vehicular Technology, vol. 69, No. 12, 6 pages, Nov. 6, 2020, pp. 16336-16341, XP011832536, Chapter III to V.

* cited by examiner

One Frame (TDD)
10 ms
300
subframe
RB
slot
D D D D D D D D D D D D X U
OFDM symbol
subcarrier
DMRS $R_x$
CSI-RS 330
PDCCH
SSS
PSS
PDSCH
PBCH
20 RBs
SS/PBCH Block system bandwidth RBs
350
D X U U U U U U U U U U U U
SRS
DMRS R
PUCCH
PUSCH
SRS Comb 0
SRS Comb 1

380

400
V2I (PC5)
V2I (PC5)
V2P (PC5)
V2P (PC5)
V2V (PC5)
RSU²
402
404
406
408
410
412

450
V2N (Uu)
V2N (Uu)
BS
452
454
456
458
410

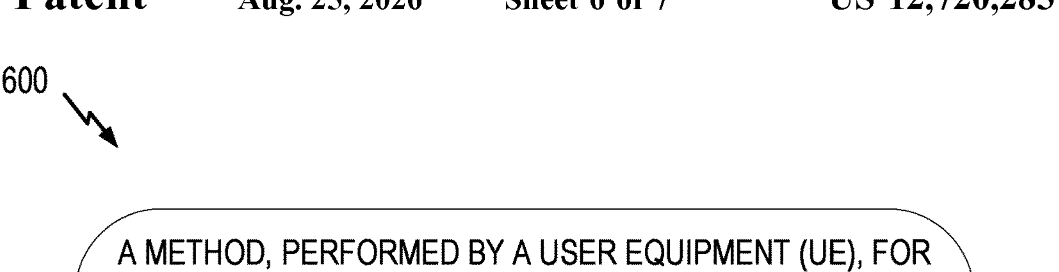

A METHOD, PERFORMED BY A USER EQUIPMENT (UE), FOR APPLYING REDUNDANCY MITIGATION TECHNIQUES WHEN TRANSMITTING SENSOR DATA SHARING MESSAGES (SDSMs)

610 OBSERVE, VIA ONE OR MORE SENSORS, A SET OF OBJECTS IN AN ENVIRONMENT IN WHICH THE SIDELINK UE IS OPERATING

620 APPLY ONE OR MORE REDUNDANCY MITIGATION RULES TO THE SET OF OBJECTS

630 DETERMINE, FROM THE SET OF OBJECTS, A NUMBER OF OBJECTS TO BE SHARED WITH ONE OR MORE OTHER SIDELINK UES AFTER THE ONE OR MORE REDUNDANCY MITIGATION RULES HAVE BEEN APPLIED TO THE SET OF OBJECTS

640 DETERMINE, BASED ON THE DETERMINED NUMBER OF OBJECTS TO BE SHARED, WHETHER TO TRANSMIT AN SDSM TO THE ONE OR MORE OTHER SIDELINK UES INDICATING THE OBJECTS TO BE SHARED FROM THE SET OF OBJECTS THAT WERE OBSERVED VIA THE ONE OR MORE SENSORS OF THE SIDELINK UE

650 TAKE ONE OR MORE ACTIONS BASED ON THE DETERMINATION OF WHETHER TO TRANSMIT THE SDSM

*FIG. 6*

SENSOR DATA SHARING REDUNDANCY MITIGATION TECHNIQUES

CROSS-REFERENCE TO RELATED APPLICATIONS

This application is a national stage application under 35 U.S.C. 371 of PCT/CN2021/113457, filed Aug. 19, 2021, which is hereby expressly incorporated by reference herein in its entirety as if fully set forth below and for all applicable purposes.

INTRODUCTION

Aspects of the present disclosure relate to wireless communications, and more particularly, to redundancy mitigation techniques for sensor data sharing in sidelink communication.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by sidelink user equipment (UE). The method generally includes observing, via one or more sensors, a set of objects in an environment in which the sidelink UE is operating, applying one or more redundancy mitigation rules to the set of objects, determining, from the set of objects, a number of objects to be shared with one or more other sidelink UEs after the one or more redundancy mitigation rules have been applied to the set of objects, determining, based on the determined number of objects to be shared, whether to transmit a sensor data sharing message (SDSM) to the one or more other sidelink UEs indicating the objects to be shared from the set of objects that were observed via the one or more sensors of the sidelink UE, and taking one or more actions based on the determination of whether to transmit the SDSM.

Certain aspects can be implemented in an apparatus for wireless communication. The apparatus may include a memory comprising executable instructions and one or more processors configured to execute the executable instructions and cause the apparatus to: observe, via one or more sensors, a set of objects in an environment in which the apparatus is operating, apply one or more redundancy mitigation rules to the set of objects, determine, from the set of objects, a number of objects to be shared with one or more sidelink UEs after the one or more redundancy mitigation rules have been applied to the set of objects; determine, based on the determined number of objects to be shared, whether to transmit a sensor data sharing message (SDSM) to the one or more sidelink UEs indicating the objects to be shared from the set of objects that were observed via the one or more sensors of the apparatus, and take one or more actions based on the determination of whether to transmit the SDSM.

Certain aspects can be implemented in an apparatus for wireless communication. The apparatus may include means for observing, via one or more sensors, a set of objects in an environment in which the sidelink UE is operating, means for applying one or more redundancy mitigation rules to the set of objects, means for determining, from the set of objects, a number of objects to be shared with one or more other sidelink UEs after the one or more redundancy mitigation rules have been applied to the set of objects, means for determining, based on the determined number of objects to be shared, whether to transmit a sensor data sharing message (SDSM) to the one or more other sidelink UEs indicating the objects to be shared from the set of objects that were observed via the one or more sensors of the sidelink UE, and means for taking one or more actions based on the determination of whether to transmit the SDSM.

Certain aspects can be implemented in a non-transitory computer-readable medium for wireless communication. The non-transitory computer-readable medium may include executable instructions that, when executed by one or more processors of an apparatus, cause the apparatus to: observe, via one or more sensors, a set of objects in an environment in which the apparatus is operating, apply one or more redundancy mitigation rules to the set of objects, determine, from the set of objects, a number of objects to be shared with one or more sidelink UEs after the one or more redundancy mitigation rules have been applied to the set of objects; determine, based on the determined number of objects to be shared, whether to transmit a sensor data sharing message (SDSM) to the one or more sidelink UEs indicating the objects to be shared from the set of objects that were observed via the one or more sensors of the apparatus, and take one or more actions based on the determination of whether to transmit the SDSM.

Certain aspects can be implemented in a computer program product for wireless communication. The computer program product may be embodied on a computer-readable storage medium and may comprising code for: observing, via one or more sensors, a set of objects in an environment in which the sidelink UE is operating, applying one or more redundancy mitigation rules to the set of objects, determining, from the set of objects, a number of objects to be shared with one or more other sidelink UEs after the one or more redundancy mitigation rules have been applied to the set of objects, determining, based on the determined number of objects to be shared, whether to transmit a sensor data sharing message (SDSM) to the one or more other sidelink UEs indicating the objects to be shared from the set of objects that were observed via the one or more sensors of the sidelink UE, and taking one or more actions based on the determination of whether to transmit the SDSM.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIG. 6 is a flow diagram illustrating example operations for wireless communication by a sidelink user equipment.

DETAILED DESCRIPTION

Aspects of the present disclosure provide apparatuses, methods, processing systems, and computer-readable mediums for applying redundancy mitigation techniques when determining whether or not to transmit a sensor data sharing message on a sidelink channel.

For example, in certain scenarios, such as autonomous driving, vehicles (or user equipments (UEs) within the vehicles) within a wireless network (e.g., a vehicle-to-everything (V2X) system) may communicate with each other using sidelink signals. In some cases, this type of communication may include the sharing of sensor information of the vehicles participating in the communication. When in certain scenarios or environments, such as driving on a road, sensor sharing may enhance situational awareness by sharing observed objects detected via one or more sensors, improving driving decisions and coordinated maneuvers. However, in some cases, observed objects may be redundantly shared, which can lead to congestion in the wireless network. To help resolve this possibility, one or more redundancy mitigation rules may be applied by a UE of a vehicle to reduce a number of objects observed that are shared in sensor data sharing messages (SDSMs) with other UEs in the environment.

However, there may be cases when these one or more redundancy mitigation rules may lead to negative effects, such as when UEs are in close proximity to each other and when not many objects are included within SDSMs. For example, when the one or more redundancy rules are aggressively applied there could be cases when no objects are shared, yet an SDSM is still transmitted that only includes information identifying information of a UE that transmitted the SDSM. These types of SDSMs are essentially useless to other UEs in the environment and yet still require the use of sub-channels within the wireless network—unnecessarily consuming time and frequency resources within the wireless network and power resources used in transmitting and receiving these SDSMs.

Therefore, aspects of the present disclosure provide additional rules that may be used after the one or more redundancy mitigation rules have been applied. In some cases, these additional rules may allow for a UE to omit transmission of an SDSM or adjust (e.g., enlarge) a periodicity at which SDSMs are transmitted. In some cases, omitting the transmission of an SDSM or enlarging a periodicity for transmitting the SDSM may reduce the chances of unnecessarily consuming time and frequency resources within the wireless network (e.g., V2X system) that may result from transmitting SDSMs with essentially meaningless information (e.g., SDSMs with little to no observed objects). Additionally, these techniques may also help to conserve power since UEs may not need to expend power transmitting and receiving these SDSMs.

Introduction to Wireless Communication Networks

Figure 1:
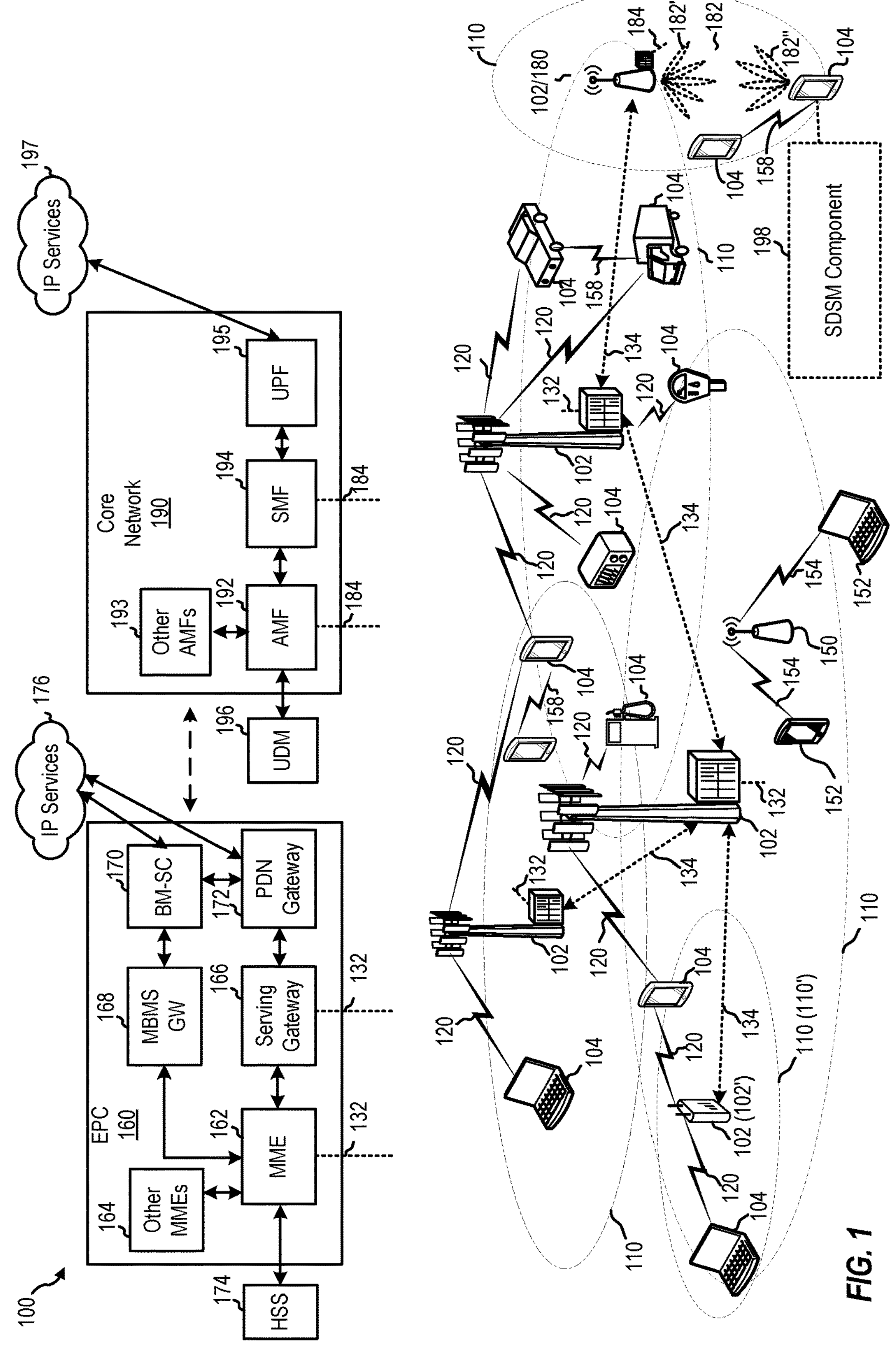
FIG. 1 is a block diagram conceptually illustrating an example wireless communication network.

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, a transceiver function, a transmitter receiver point (TRP), or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Wireless communication network 100 further includes an SDSM component 198, which may be configured to perform the operations in FIG. 6, as well as other operations described herein for applying redundancy mitigation techniques when determining whether or not to transmit a sensor data sharing message on a sidelink channel.

Figure 2:
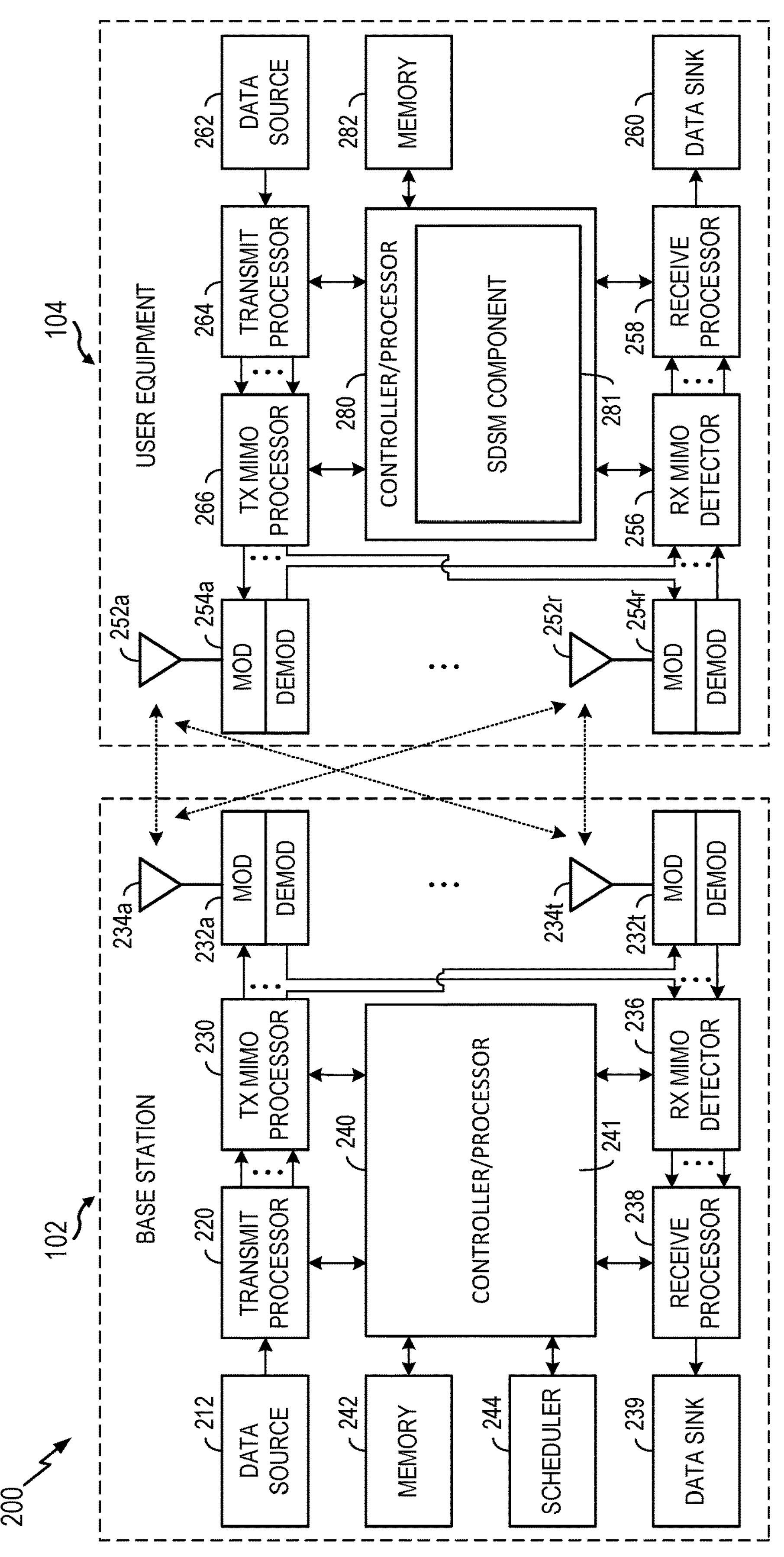
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes SDSM component 281, which may be representative of SDSM component 198 of FIG. 1. Notably, while depicted as an aspect of controller/processor 280, SDSM component 281 may be implemented additionally or alternatively in various other aspects of user equipment 104 in other implementations. In some cases, the SDSM component 281 may be configured to perform the operations in one or more of FIG. 6, as well as other operations described herein for applying redundancy mitigation techniques when determining whether or not to transmit a sensor data sharing message on a sidelink channel.

Figures 3A, 3B, 3C, 3D:
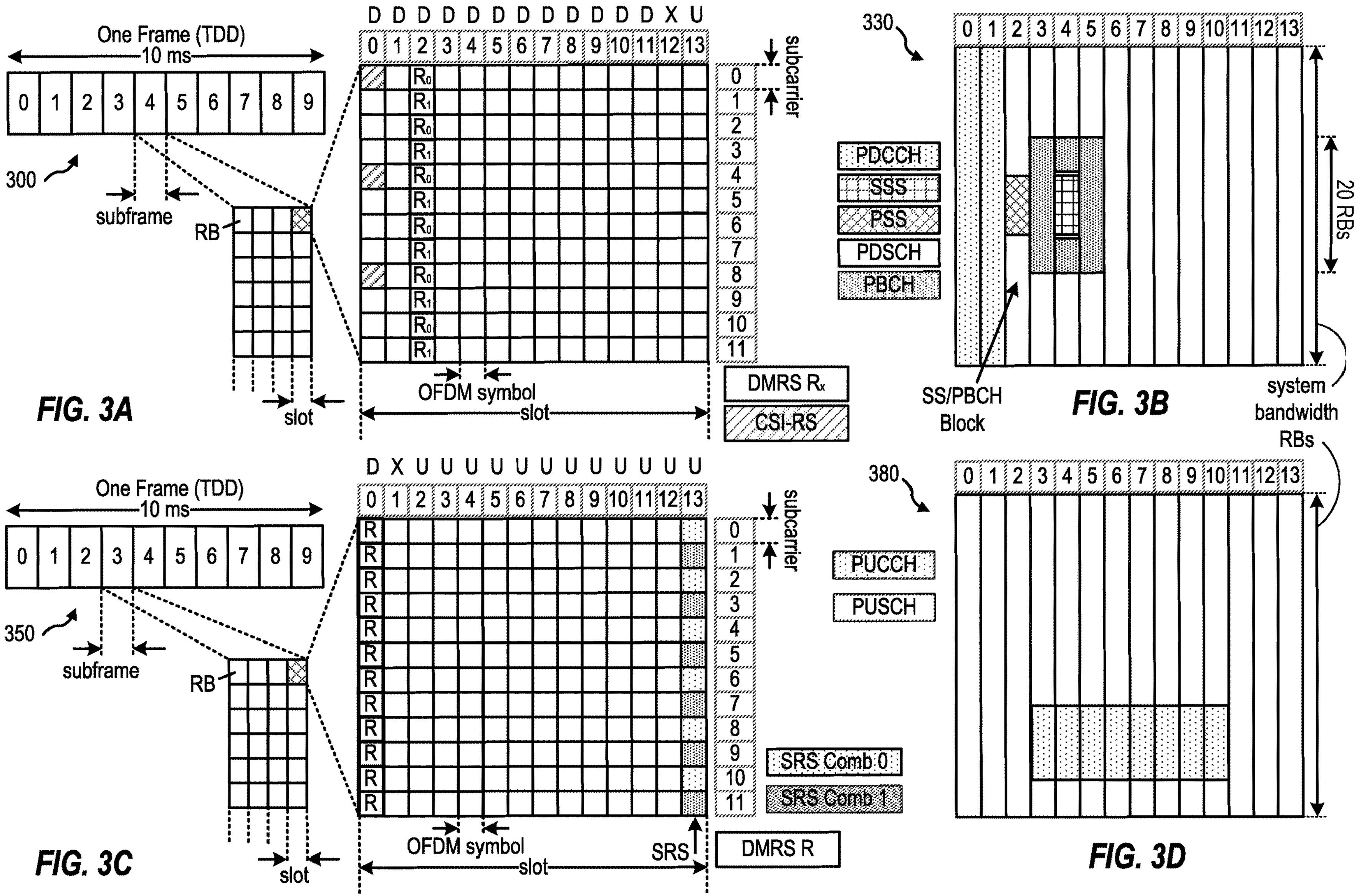
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Sidelink Communication

In some examples, two or more subordinate entities (e.g., UEs 104) may communicate with each other using sidelink signals. Real-world applications of such sidelink communications may include public safety, proximity services, UE-to-network relaying, vehicle-to-vehicle (V2V) communications, vehicle-to-everything (V2X), Internet of Everything (IoE) communications, IoT communications, mission-critical mesh, and/or various other suitable applications. Generally, a sidelink signal may refer to a signal communicated from one subordinate entity (e.g., UE 104) to another subordinate entity (e.g., another UE 104) without relaying that communication through the scheduling entity (e.g., UE 104 or BS 102), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as acknowledgement (ACK) and or negative ACK (NACK) information corresponding to transmissions on the PSSCH. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

Figures 4A, 4B:
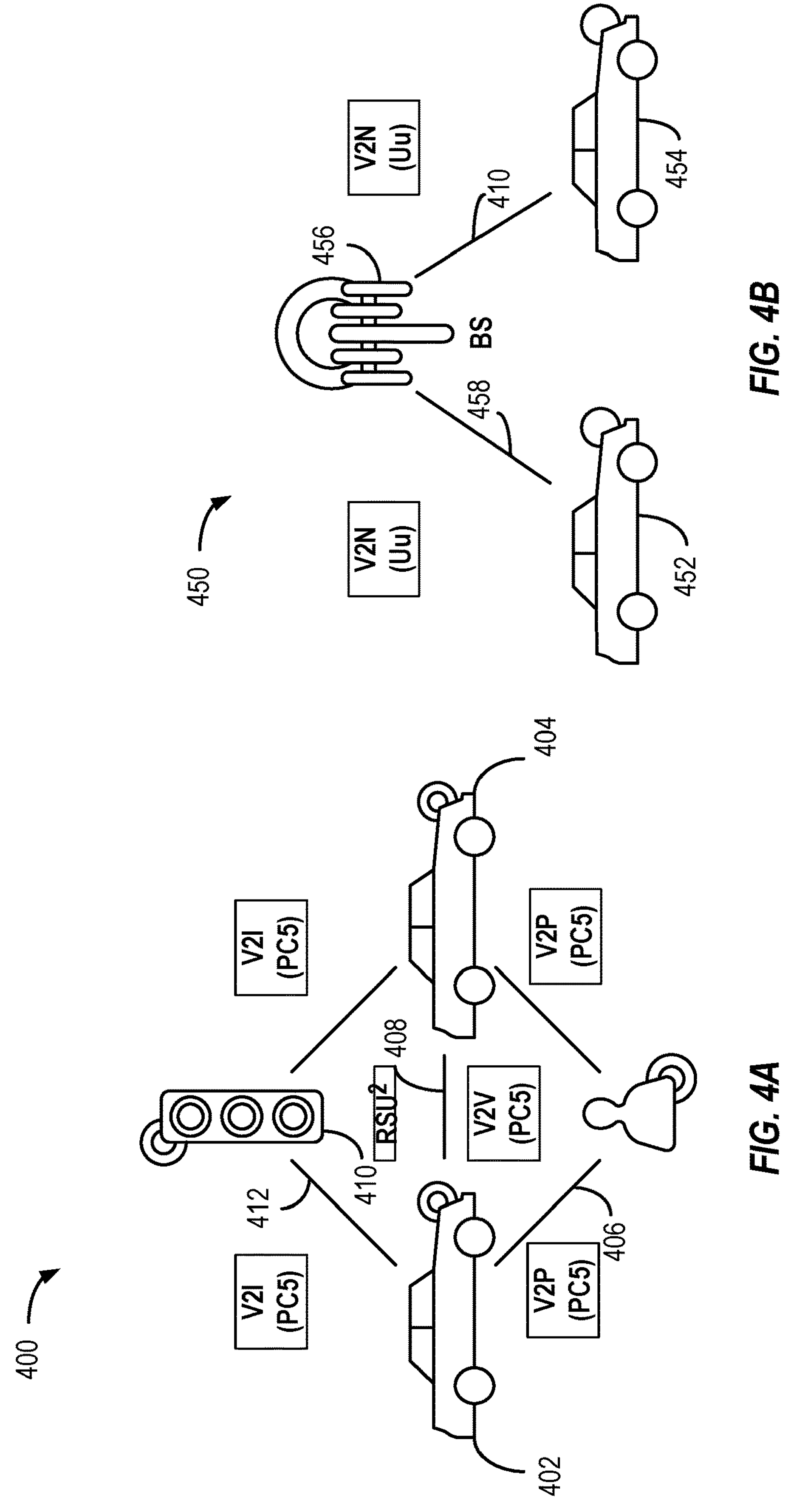
FIG. 4A and FIG. 4B show diagrammatic representations of example vehicle to everything (V2X) systems.

FIG. 4A and FIG. 4B show diagrammatic representations of example V2X systems, in accordance with some aspects of the present disclosure. For example, the vehicles shown in FIG. 4A and FIG. 4B may communicate via sidelink channels and may relay sidelink transmissions as described herein. V2X is a vehicular technology system that enables vehicles to communicate with the traffic and the environment around them using short-range wireless signals, known as sidelink signals.

The V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 102), that sends and receives information to and from (for example, relays information between) vehicles 452, 454. The network communications through vehicle to network (V2N) links 458 and 460 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Aspects Related to Redundancy Mitigation Techniques for Sensor Sharing in Sidelink Communication As noted above, two or more subordinate entities (e.g., UEs 104) may communicate with each other using sidelink signals. One real-world application of such sidelink communications may include V2V communication in a V2X system in which UEs of two or more vehicles may communicate with each other. In some cases, this type of communication may include the sharing of sensor information of the vehicles participating in the communication. When in certain scenarios or environments, such as driving on a road, sensor sharing may enhance situational awareness for entities in the V2X system (e.g., RSUs, vehicles, vulnerable road users (VRUs), etc.) by sharing objects detected via one or more sensors to improve driving decisions and coordinated maneuvers. In some cases, these detected objects may include, for example, non-cellular V2X vehicles, VRUs, and road obstacles.

Figures 5A, 5B:
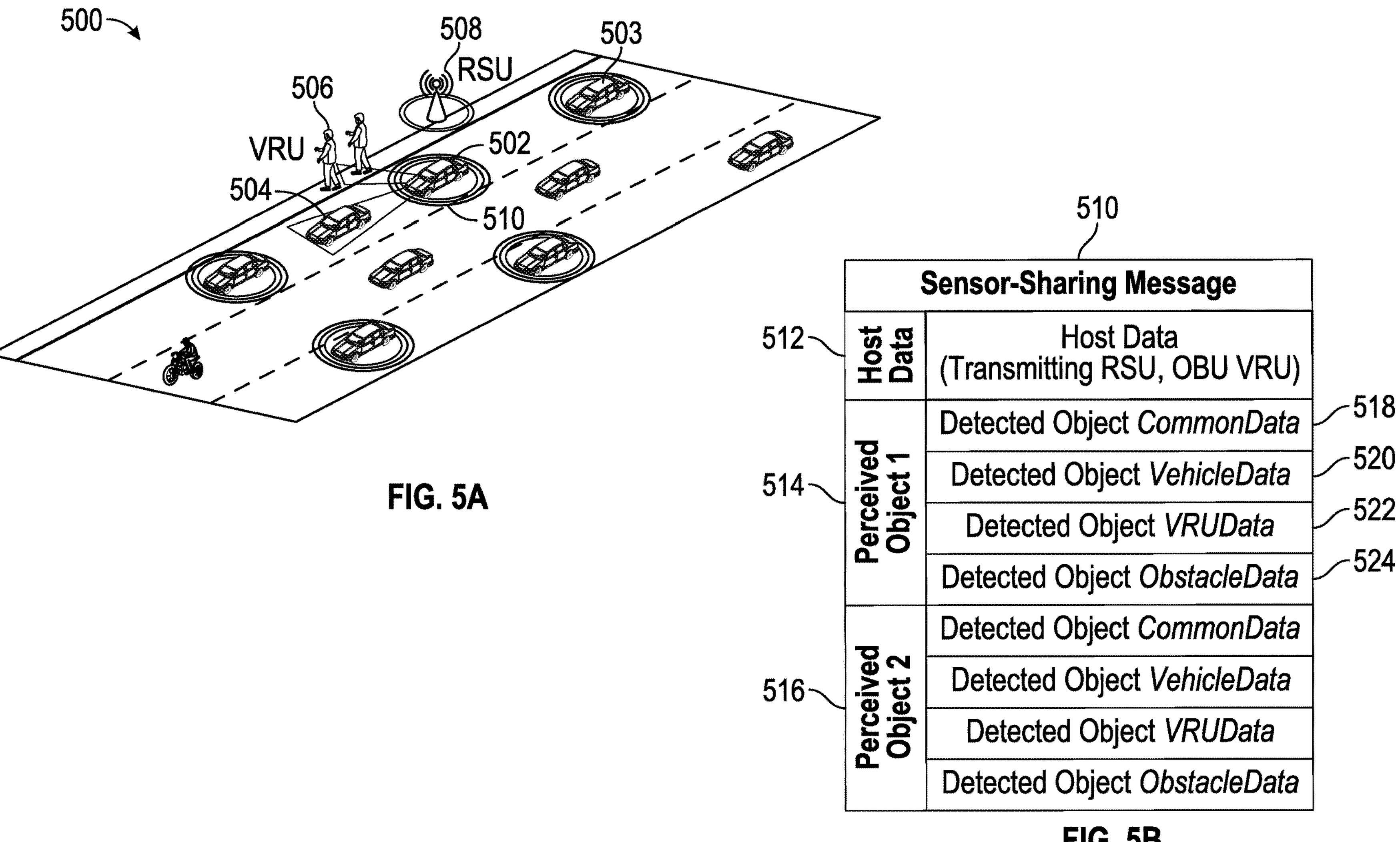
FIG. 5A and FIG. 5B illustrate an example environment in which a V2X system may be employed and an example sensor data sharing message (SDSM) that may be transmitted in the V2X system, respectively.

FIG. 5A illustrates an example environment 500 in which a V2X system may be employed. As illustrated, the environment 500 may include a plurality of cellular V2X (CV2X)-capable vehicles (e.g., vehicle 502, vehicle 503), a plurality of non-CV2X vehicles (e.g., vehicle 504), a plurality of VRUs (e.g., VRU 506), and a plurality of RSUs (e.g., RSU 508). In some cases, the vehicle 502 may include the vehicle 402, the vehicle 404, the vehicle 452, the vehicle 454 illustrated in FIGS. 4A and 4B. In some cases, the vehicle 502 may include the UE 104 illustrated in FIG. 1.

In some cases, while operating in the environment 500, the vehicle 502 may sense one or more objects in the environment 500, such as the vehicle 504 and VRU 506, via one or more sensors. In some cases, the one or more sensors may include external sensors for sensing objects external from the vehicle 502 and internal sensors for sensing certain conditions associated with the vehicle 502 itself. In some cases, the external sensors may include, for example, cameras, radar sensors, light detection and ranging (LIDAR) sensors, global navigation satellite system (GNSS) sensors, mapping sensors, and the like. The internal sensors may include, for example, engine monitoring sensors, speed and heading sensors, attitude sensors, and the like.

In some cases, to improve situational awareness in the environment 500 (e.g., improve driving decisions and coordinated maneuvers), the vehicle 502 may decide to transmit a sensor data sharing message (SDSM) 510 to other V2X-capable vehicles (e.g., vehicle 503) or RSUs in the environment 500. FIG. 5B illustrates an example sensor sharing message, such as the SDSM 510. As shown, the SDSM 510 may include a plurality of fields including host data and perceived data. In some cases, the host data may include, for example, a host data field 512 that includes information about the vehicle that transmits the SDSM 510 (e.g., vehicle 502). Further, in some cases, the perceived data may one or more perceived (or sensed) object fields for each object sensed by the vehicle 502, such as the perceived object field 514 and perceived object field 516. The perceived object field 514 and perceived object field 516 may include one or more subfields that include specific information about a corresponding sensed object. For example, as shown in FIG. 5B, the perceived object field 514 may include a common data sub-field 518 associated with a first detected object, a vehicle data sub-field 520 associated with the first detected object, a VRU data sub-field 522 associated with the first detected object, and an obstacle data sub-field 524 associated with the first detected object. In some cases, the sub-fields of the perceived object field 514 may include information about one perceived/observed objects, such as a vehicle size, a velocity and a corresponding confidence value, and the like.

In some cases, the SDSM 510 may be transmitted using a connectionless groupcast technology that enables efficient sharing of detected objects over limited areas of interest, without performing additional group signaling. Transmitting sensor sharing messages using this connectionless groupcast technology may reduce congestion in dense urban environments. However, while groupcast technology may reduce congestion, there may be scenarios in which sensed or perceived objects are repeatedly and redundantly shared. Redundantly sharing about a same sensed object may increase channel load in the V2X system, which may degrade a packet reception ratio and object awareness ratio. To help reduce redundantly sharing perceived objects, one or more redundancy mitigation rules may be applied by a vehicle, such as the vehicle 502 (e.g., UE 104), when deciding whether to transmit the SDSM 510. In some cases, the one or more redundancy mitigation rules may reduce the number of perceived objects (e.g., the number of perceived object fields) that are included within the SDSM 510.

The one or more redundancy mitigation rules may include, for example, an object self-announcement redundancy mitigation rule, a frequency-based redundancy mitigation rule, a distance-based redundancy mitigation rule, a dynamics-based redundancy mitigation rule, a confidence-based redundancy mitigation rule, and/or an entropy-based redundancy mitigation rule. When using the object self-announcement redundancy mitigation rule, the vehicle 502 may omit a perceived object from the SDSM 510 if the perceived object itself is V2X-capable and transmits its own V2X messages (e.g., basic safety messages (BSMs), SDSM, etc.). The object self-announcement redundancy mitigation rule is a straight-forward mechanism to identify and eliminate V2X-capable entities (RSUs, OBUs) from the SDSM 510. As a result, a message size of the SDSM 510 may decrease with increasing market penetration rate, as other V2X-capable vehicles or other traffic participants are no longer included in a SDSM. However, an SDSM originator (e.g., vehicle 502) must associate received SDSMs, BSMs with onboard units (OBUs) and RSUs detected by its sensors. Additionally, it is assumed that all other surrounding SDSM originators also receive the V2X message from the object omitted from the SDSM, which may not always be the case in challenging signal propagation environments.

The frequency-based redundancy mitigation rule involves, on each collective perception message (CPM) (e.g., SDSM 510) generation event, the transmitting V2X-capable vehicle (e.g., vehicle 502) analyzing a history of CPMs that it has received from other remote V2X-capable vehicles (e.g., vehicle 503) during a recent time window of length W_Redundancy. The frequency-based redundancy mitigation rule omits locally perceived objects from a new CPM if the number of historical CPMs that include information about the same objects is more than a threshold N_Redundancy. The impact of a potential loss of CPMs can be mitigated by increasing the threshold N_Redundancy, as this will correspond to an increase of the likelihood that each remote V2X-capable vehicles can receive at least one of the previous CPMs that include information about the same object during the time window of length W_Redundancy.

However, a higher value for the threshold N_Redundancy may result in information about the same object being transmitted more frequently, thereby limiting the reduction of network channel load. Additionally, a locally perceived object may be omitted from a new CPM regardless of the quality of object information included in any previous CPM. If any of the previous CPMs contain only inaccurate information about the locally perceived object, omitting that object information from a new CPM may lead to a performance degradation of the CP service on the receiver side. Further, information about a locally perceived object may be transmitted in a burst of N_redundancy CPMs. After this burst, no CPM would include information about that object during the remainder of the time window W_Redundancy, which might not be optimal for object tracking systems.

The distance-based redundancy mitigation rule involves, on each CPM (e.g., SDSM 510) generation event, the transmitting V2X-capable vehicle (e.g., vehicle 502) analyzing a history of CPMs that it has received from other remote V2X-capable vehicles (e.g., vehicle 503). The distance-based redundancy mitigation rule omits redundant objects among locally perceived objects from a new CPM if: (1) the same objects are included in the received CPMs from remote ITS-Ss during the recent time window of length W_Redundancy, and (2) any Euclidian absolute distances between a current reference point of the transmitting V2X-capable vehicle and reference points of the other remote V2X-capable vehicle (e.g., the remote V2X-capable vehicles' reference points which are indicated in a lastly received CPMs including the same objects) is less than a threshold range of R_Redundancy.

The distance-based redundancy mitigation rule may efficiently increase the awareness range within an environment, such as the environment 500. Additionally, the perceived object information can be propagated farther with limited amount of redundancy. Further, channel load within the V2X system may be reduced by limiting redundancy when it does not effectively increase the awareness range. However, an appropriate value of the threshold range, R_Redundancy may need to be used. If R_Redundancy is too small, the channel load may not be properly reduced. Additionally, If R_Redundancy is too large, the benefit of the increase awareness range may not be achieved even though the channel load can be reduced well.

The dynamics-based redundancy mitigation rule on each CPM (e.g., SDSM 510) generation event, the transmitting V2X-capable vehicle (e.g., vehicle 502) analyzing a history of CPMs that it has received from other remote V2X-capable vehicles (e.g., vehicle 503). The dynamics-based redundancy mitigation rule omits a perceived object if. (1) the Euclidian absolute distance between the current estimated position of the reference point of the perceived object and the estimated position of the reference point of this perceived object lastly included in a received CPM is below P_Redundancy, with P_Redundancy≤4 m, and (2) the difference between the current estimated absolute speed of the reference point of the perceived object and the estimated absolute speed of the reference point of this perceived object lastly included in a received CPM is below S_Redundancy, with S_Redundancy≤0.5 m/s.

In some cases, a locally perceived object moving at a higher speed or with a higher acceleration will be reported more frequently than a locally perceived object moving at a lower speed or with a lower acceleration. If the speed of a locally perceived object is constant, it will be reported periodically (e.g., with regular time intervals), which can benefit object tracking systems. Additionally, with P_Redundancy=4 m and S_Redundancy=0.5 m/s, the redundancy as a result of multiple transmissions can be reduced. Additionally, multiple transmitters perceiving the same object may generate a reporting rate similar to that of a single transmitter. However, a lower P_Redundancy and S_Redundancy may result in information about the same perceived object being transmitted more frequently, thereby limiting the reduction of network channel load.

In some cases, a packet size of an SDSM, such as the SDSM 510, may depend on the host data (e.g., in the host data field 512 of the SDSM 510) and a number of perceived objects included within the perceived object information (e.g., in the perceived object fields 514, 516 of the SDSM 510). For example, the host data of an SDSM may be approximately 35 bytes and each perceived object included within an SDSM may be approximately 72 bytes. Accordingly, the packet size of an SDSM may equal (35+72*N) bytes, where Nis a number of selected perceived objects after redundancy mitigation rules are applied. When using the one or more redundancy mitigation rules described above, the one or more redundancy mitigation rules may efficiently reduce redundancies and, hence, reduce the packet size of SDSMs (e.g., SDSM 510) (e.g., reduce the size of the perceived object information in the SDSM), without losing object awareness when parameters for each approach are carefully selected.

However, in some cases, the one or more redundancy mitigation rules may negatively affect a packet reception ration (PPR), which may be defined as $$PPR = \frac{\#\text{ of decoded packets}}{\text{total }\#\text{ of received packets at a specific distance}}.$$

For example, when N is small (e.g., below a threshold, such as 0, 1, or 2), the packet reception ratio in close transmit-receive (Tx-Rx) distances between the V2X-capable vehicle that transmits an SDSM (e.g., vehicle 502 in FIG. 5) and the other remote V2X-capable vehicles that receive the SDSM (e.g., vehicle 503 in FIG. 5) (e.g., within approximately 100 meters), may be worse as compared to when no mitigation rules are applied case (noted as CC off) due to the nature of groupcast feedback mechanism design. For example, the SDSM may be transmitted in a feedback-based groupcast mode in which only negative acknowledgements (NAKs) are sent when reception of the SDSM fails. When packet size as well as Tx-Rx distance is small, decoding of the SDSM is successfully completed by UEs of V2X-capable vehicles in most of the cases. However, there may be instances in which only one receiving UE could fail decoding of the SDSM while other receiving UEs correctly receive and decode the SDSM and, thus, do not send a NAK to the transmitting UE. In such cases, the one receiving UE that failed to decode the SDSM may not have a chance to decode this SDSM again since retransmission is not performed by the transmitting UE due to not receiving any NAKs.

Moreover, when the one or more redundancy mitigation rules are aggressively applied, N may be small, meaning not many perceived objects will be included within an SDSM. For example, in cases when N equals zero, no perceived objects will be shared. As such, only the host data of an SDSM may be shared when N equals zero, which is meaningless to other V2X-capable vehicles. Moreover, sharing this essentially meaningless information within an SDSM requires the reservation of sub-channels for the transmission SDSM and for feedback related to the reception of the SDSM, which unnecessarily consumes time and frequency resources within the V2X system and wastes power at both the V2X-capable vehicle that transmits the SDSM and a remote V2X-capable vehicle that receives the SDSM.

Accordingly, aspects of the present disclosure provide techniques for helping to reduce the issues described above when applying the one or more redundancy mitigation rules. For example, the techniques presented herein include additional rules that may be applied after the one or more redundancy mitigation rules described above have been applied. In some cases, these additional rules may allow for a V2X-capable vehicle (e.g., UE 104) to omit transmission of an SDSM or adjust (e.g., enlarge) a periodicity at which SDSMs are transmitted. In some cases, these rules may be applied when a number of perceived/observed objects to be shared in an SDSM is less than a minimum number of objects threshold. In some cases, omitting the transmission of an SDSM or enlarging a periodicity for transmitting the SDSM when the number of perceived/observed objects to be shared in the SDSM is less than the minimum number of objects threshold may reduce the chances of unnecessarily consuming time and frequency resources within the V2X system that may result from transmitting SDSMs with essentially meaningless information (e.g., SDSMs with little to no perceived objects). Additionally, these techniques may also help to conserve power since V2X-capable vehicles may not need to expend power transmitting and receiving these SDSMs.

Example Method for Applying Redundancy Mitigation Techniques for Sensor Data Sharing in Sidelink Communication FIG. 6 is a flow diagram illustrating example operations 600 for wireless communication, in accordance with certain aspects of the present disclosure. The operations 600 may be performed, for example, by a sidelink UE for applying redundancy mitigation techniques when determining whether or not to transmit a sensor data sharing message on a sidelink channel. In some cases, the sidelink UE may comprise a V2X-capable vehicle, such as the vehicle 502 in FIG. 5 which may include the UE 104 in the wireless communication network 100 of FIG. 1. The operations 600 may be implemented as software components that are executed and run on one or more processors (e.g., controller/processor 280 of FIG. 2). Further, the transmission and reception of signals by the sidelink UE in operations 600 may be enabled, for example, by one or more antennas (e.g., antennas 252 of FIG. 2). In certain aspects, the transmission and/or reception of signals by the sidelink UE may be implemented via a bus interface of one or more processors (e.g., controller/processor 280, including the SDSM component 281) obtaining and/or outputting signals.

The operations 600 begin, in block 610, with observing, via one or more sensors, a set of objects in an environment in which the sidelink UE is operating, such as environment 500 illustrated in FIG. 5A. In some cases, the one or more sensors may include, for example, cameras, radar sensors, LIDAR sensors, GNSS sensors, mapping sensors, and the like.

In block 620, the sidelink UE applies one or more redundancy mitigation rules to the set of objects. The one or more redundancy mitigation rules may include, for example, an object self-announcement redundancy mitigation rule, a frequency-based redundancy mitigation rule, a distance-based redundancy mitigation rule, a dynamics-based redundancy mitigation rule, a confidence-based redundancy mitigation rule, and/or an entropy-based redundancy mitigation rule. In some cases, applying the one or more redundancy mitigation rules may reduce a number of objects in the observed set of objects, as described above.

In block 630, the sidelink UE determines, from the set of objects, a number of objects to be shared (N) with one or more other sidelink UEs after the one or more redundancy mitigation rules have been applied to the set of objects. In some cases, these one or more other sidelink UEs may include other remote V2X-capable vehicles (e.g., vehicle 503 in FIG. 5), as described above.

In block 640, the sidelink UE determines, based on the determined number of objects to be shared, whether to transmit a sensor data sharing message (SDSM) to the one or more other sidelink UEs indicating the objects to be shared from the set of objects that were observed via the one or more sensors of the sidelink UE.

In block 650, the sidelink UE takes one or more actions based on the determination of whether to transmit the SDSM.

In some cases, the sidelink UE may determine whether to transmit the SDSM to the one or more other sidelink UEs in block 640 based further on a minimum number of objects threshold. For example, as noted above, a packet side of the SDSM may be equal to (35+72*N) bytes, where Nis the number of objects to be shared with the one or more other sidelink UEs after the one or more redundancy mitigation rules have been applied to the set of objects. In some cases, when N is less than minimum number of objects threshold, the sidelink UE may decide to drop transmission of the SDSM. As one example, assume that the minimum number of objects threshold is equal to three and that the determined number of objects to be shared (e.g., N). In such cases, the sidelink UE may drop the SDSM transmission. In other words, determining whether to transmit the SDSM in block 640, may include determining not to transmit the SDSM when the number of objects to be shared (e.g., N) is less than the minimum number of objects threshold. In such cases, taking the one or more actions in block 650 may include not transmitting the SDSM to the one or more other sidelink UEs based on the determination not to transmit the SDSM in block 640.

According to aspects, a direct benefit of deciding to not transmit the SDSM when the determined number of objects to be shared (e.g., N) is less than the minimum number of objects threshold is to save channel loading. These techniques are especially useful when a packet size of the SDSM is very small and the sidelink UE would otherwise have to reserve at least one sub-channel to transmit this very small packet based on the sidelink reservation mechanism for sidelink communication.

In other cases, when Nis greater the minimum number of objects threshold, the sidelink UE may decide to proceed with transmitting the SDSM. In other words, determining whether to transmit the SDSM in block 640 may include determining to transmit the SDSM when the number of objects to be shared is greater than or equal to the minimum number of objects threshold. In such cases, taking the one or more actions in block 650 may include transmitting the SDSM to the one or more other sidelink UEs based on the determination to transmit the SDSM in block 640.

In some cases, the minimum number of objects threshold may be configured in different manners. For example, in some cases, the minimum number of objects threshold may be configured in memory of the sidelink UE (e.g., memory 282 of the UE 104 illustrated in FIG. 2) by a manufacturer of the sidelink UE. In other cases, the minimum number of objects threshold may be received from a base station, such as the BS 102 illustrated in FIG. 2. In other cases, the minimum number of objects threshold may be determined by the sidelink UE based on at least one criterion, such as a channel busy ratio (CBR) measured by the sidelink UE, an application priority associated with the sidelink UE (e.g., cooperative driving), or a power saving requirement associated with the sidelink UE.

In some cases, the minimum number of objects threshold may depend on an autonomous driving reliability requirement associated with information about the environment in which the sidelink UE is operating. Additionally, in some cases, a periodicity for transmitting the SDSM may also depend on the autonomous driving reliability requirement associated with information about the environment in which the sidelink UE is operating. For example, high reliability applications, such as cooperative driving, require up to date information about surrounding environment (e.g., environment 500 in FIG. 5A) and, as a result, an awareness updating rate of perceived objects may be as low as x microseconds. Accordingly, for high reliability applications, the period for transmitting the SDSM and well as the minimum number of objects threshold should be properly configured in an application layer of the sidelink UE to make sure the timely information is shared among the other sidelink UEs. In other words, for high reliability applications (e.g., cooperative driving, such as level 5 autonomous driving), the period for transmitting the SDSM should be more frequent and the minimum number of objects threshold may be lower as compared to lower reliability applications (e.g., partially automated driving, such as level 2 autonomous driving).

For example, in some cases, when the autonomous driving reliability requirement is a first value (e.g., 5, indicating high reliability), the minimum number of objects threshold is a second value (e.g., 1, indicating the SDSM may only need to include 1 object) and the periodicity for transmitting the SDSM is a third value (e.g., x microseconds, indicating that the SDSM is transmitted frequently). However, when the autonomous driving reliability requirement is a fourth value that is less than the first value (e.g., 2, indicating lower reliability), the minimum number of objects threshold is a fifth value that is greater than the second value (e.g., 3, indicating that the SDSM should include at least three objects, which may result in the SDSM being transmitted less frequently) and the periodicity for transmitting the SDSM is a sixth value that is greater than the third value (e.g., y microseconds, indicating that the SDSM is transmitted less frequently). As can be seen, when the autonomous driving reliability requirement is higher, the minimum number of objects threshold and periodicity for transmitting the SDSM may be lower (e.g., the SDSM may be transmitted more frequently and with less numbers of objects) as compared to when the autonomous driving reliability requirement is lower.

In some cases, the periodicity for transmitting the SDSM may be adjusted when the number of packets to be shared is continuously below minimum number of objects threshold within a time window. This scenario (e.g., when the number of packets to be shared is continuously below minimum number of objects threshold) may indicate that the sidelink UE may be in a less dense or static environment and that there is a limited number of objects are worth to be shared to the other sidelink UEs in the environment. In such cases, to save resources (e.g., time, frequency, and/or power resources) and to improve physical layer performance of the sidelink UE, a longer periodicity of the SDSM may be configured by an application layer of the sidelink UE.

Accordingly, for example, determining the number of objects to be shared with one or more other sidelink UEs in block 630 may include periodically determining the number of objects to be shared with one or more other sidelink UEs within a time window. The sidelink UE may then determine that the periodically determined number of objects to be shared with the other sidelink UEs is less than the minimum number of objects threshold within the time window. In such cases, the sidelink UE may increase the periodicity for transmitting the SDSM based on the determination that the periodically determined number of objects to be shared with the other sidelink UEs is below the minimum number of objects threshold within the time window. Thereafter, in block 650, the sidelink UE may take the one or more actions by transmitting the SDSM according to the increased periodicity.

In some cases, the sidelink UE may make the determination that the periodically determined number of objects to be shared with the other sidelink UEs is less than the minimum number of objects threshold within the time window based on an average of the periodically determined number of objects. For example, assume that the sidelink UE determines the number of objects to be shared five times within the time window. In such cases, when the sidelink UE determines that at least three out of the five times the periodically determined number of objects is less than the minimum number of objects threshold (e.g., indicating that, on average, the periodically determined number of objects is less than the minimum number of objects threshold), the sidelink UE may decide to increase the periodicity for transmitting the SDSM. In other cases, the sidelink UE determines that only one or two out of the five times the periodically determined number of objects is less than the minimum number of objects threshold (e.g., indicating that, on average, the periodically determined number of objects is not less than the minimum number of objects threshold), the sidelink UE may decide not to adjust (or in some cases, decrease) the periodicity for transmitting the SDSM.

Example Wireless Communication Devices

Figure 7:
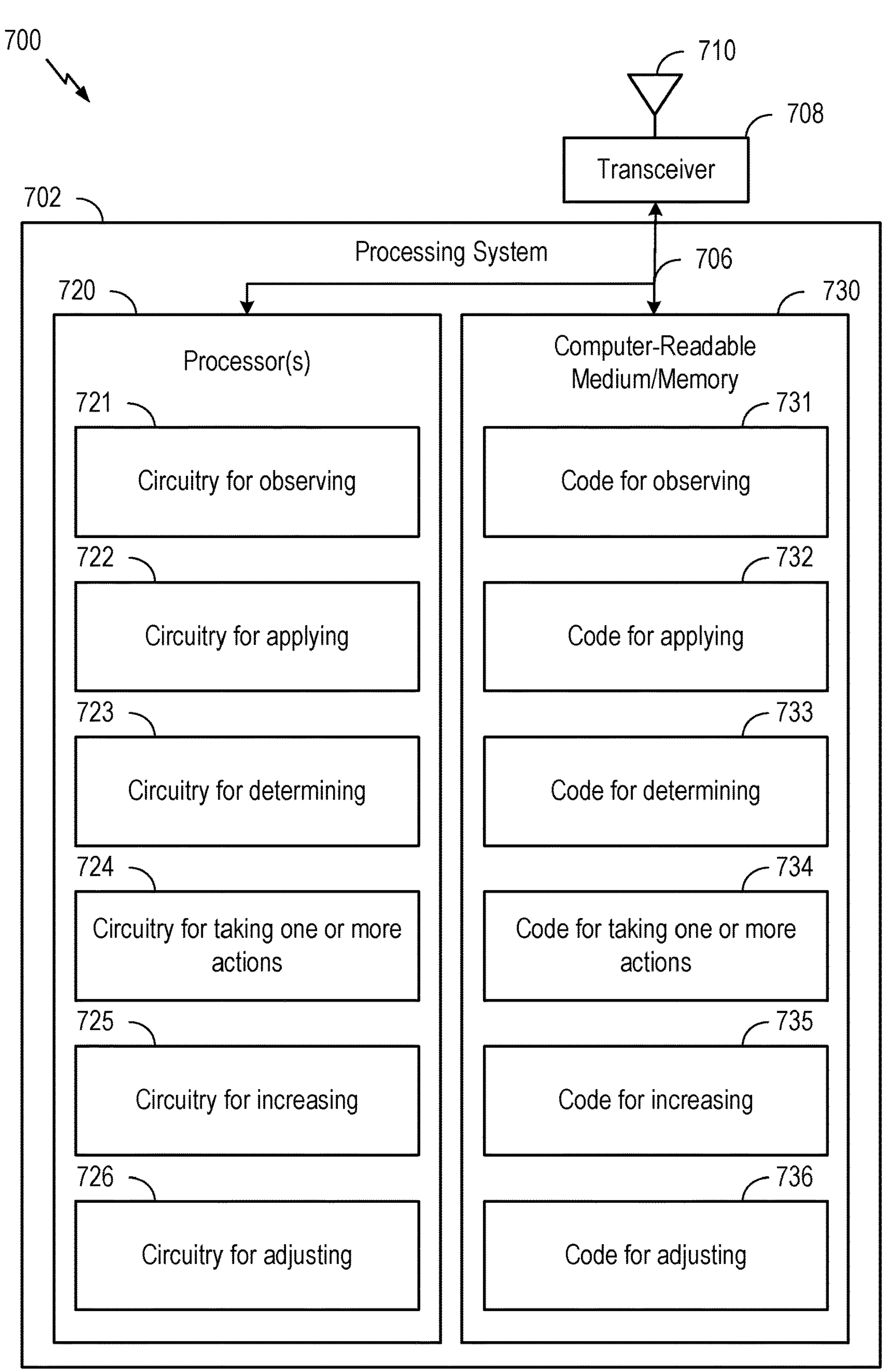
FIG. 7 depicts aspects of example communications devices.

FIG. 7 depicts an example communications device 700 that includes various components operable, configured, or adapted to perform operations for the techniques disclosed herein, such as the operations depicted and described with respect to FIG. 6. In some examples, communication device 700 may be a user equipment 104 as described, for example with respect to FIGS. 1 and 2.

Communications device 700 includes a processing system 702 coupled to a transceiver 708 (e.g., a transmitter and/or a receiver). Transceiver 708 is configured to transmit (or send) and receive signals for the communications device 700 via an antenna 710, such as the various signals as described herein. Processing system 702 may be configured to perform processing functions for communications device 700, including processing signals received and/or to be transmitted by communications device 700.

Processing system 702 includes one or more processors 720 coupled to a computer-readable medium/memory 730 via a bus 706. In certain aspects, computer-readable medium/memory 730 is configured to store instructions (e.g., computer-executable code) that when executed by the one or more processors 720, cause the one or more processors 720 to perform the operations illustrated in FIG. 6, or other operations for performing the various techniques discussed herein for applying redundancy mitigation techniques when determining whether or not to transmit a sensor data sharing message on a sidelink channel.

In the depicted example, computer-readable medium/memory 730 stores code 731 for observing, code 732 for applying, code 733 for determining, code 734 for taking one or more actions, code 735 for increasing, and code 736 for adjusting.

In the depicted example, the one or more processors 720 include circuitry configured to implement the code stored in the computer-readable medium/memory 730, including circuitry 721 for observing, circuitry 722 for applying, circuitry 723 for determining, circuitry 724 for taking one or more actions, circuitry 725 for increasing, and circuitry 726 for adjusting.

Various components of communications device 700 may provide means for performing the methods described herein, including with respect to FIG. 9.

In some examples, means for transmitting or sending (or means for outputting for transmission) may include the transceivers 254 and/or antenna(s) 252 of the user equipment 104 illustrated in FIG. 2 and/or transceiver 708 and antenna 710 of the communication device 700 in FIG. 7.

In some examples, means for receiving (or means for obtaining) and means for observing may include the transceivers 254 and/or antenna(s) 252 of the user equipment 104 illustrated in FIG. 2 and/or transceiver 708 and antenna 710 of the communication device 700 in FIG. 7.

In some examples, means for observing, means for applying, means for determining, means for taking one or more actions, means for increasing, and means for adjusting may include various processing system components, such as: the one or more processors 1320 in FIG. 13, or aspects of the user equipment 104 depicted in FIG. 2, including receive processor 258, transmit processor 264, TX MIMO processor 266, and/or controller/processor 280 (including SDSM component 281).

Notably, FIG. 7 is just one example, and many other examples and configurations of communication device 700 are possible.

Example Clauses

Implementation examples are described in the following numbered clauses:

Clause 1: A method for wireless communication by a sidelink user equipment (UE), comprising: observing, via one or more sensors, a set of objects in an environment in which the sidelink UE is operating; applying one or more redundancy mitigation rules to the set of objects; determining, from the set of objects, a number of objects to be shared with one or more other sidelink UEs after the one or more redundancy mitigation rules have been applied to the set of objects; and determining, based on the determined number of objects to be shared, whether to transmit a sensor data sharing message (SDSM) to the one or more other sidelink UEs indicating the objects to be shared from the set of objects that were observed via the one or more sensors of the sidelink UE; and taking one or more actions based on the determination of whether to transmit the SDSM.

Clause 2: The method of Clause 1, wherein determining whether to transmit the SDSM is based further on a minimum number of objects threshold.

Clause 3: The method of Clause 2, wherein: determining whether to transmit the SDSM comprises determining to transmit the SDSM when the number of objects to be shared is greater than or equal to the minimum number of objects threshold, and taking the one or more actions comprises transmitting the SDSM to the one or more other sidelink UEs based on the determination to transmit the SDSM.

Clause 4: The method of any of Clauses 2-3, wherein: determining whether to transmit the SDSM comprises determining not to transmit the SDSM when the number of objects to be shared is less than the minimum number of objects threshold, and taking the one or more actions comprises not transmitting the SDSM to the one or more other sidelink UEs based on the determination not to transmit the SDSM.

Clause 5: The method of any of Clauses 2-5, wherein the minimum number of objects threshold is at least one of: configured in memory of the sidelink UE by a manufacturer of the sidelink UE, received by the sidelink UE from a base station, or determined by the sidelink UE based on at least one criterion.

Clause 6: The method of any of Clauses 2-5, wherein the minimum number of objects threshold and a periodicity for transmitting the SDSM depend on an autonomous driving reliability requirement associated information about the environment in which the sidelink UE is operating.

Clause 7: The method of Clause 6, wherein: when the autonomous driving reliability requirement is a first value, the minimum number of objects threshold is a second value and the periodicity for transmitting the SDSM is a third value, and when the autonomous driving reliability requirement is a fourth value that is less than the first value, the minimum number of objects threshold is a fifth value that is greater than the second value and the periodicity for transmitting the SDSM is a sixth value that is greater than the third value.

Clause 8: The method of any of Clauses 2-7, wherein determining the number of objects to be shared with one or more other sidelink UEs comprises periodically determining the number of objects to be shared with one or more other sidelink UEs within a time window.

Clause 9: The method of Clause 8, further comprising: determining that the periodically determined number of objects to be shared with the other sidelink UEs is less than the minimum number of objects threshold within the time window; and increasing a periodicity for transmitting the SDSM based on the determination that the periodically determined number of objects to be shared with the other sidelink UEs is below the minimum number of objects threshold within the time window.

Clause 10: The method of Clause 9, wherein taking the one or more actions comprises transmitting the SDSM according to the increased periodicity.

Clause 11: The method of any of Clauses 1-10, wherein the one or more redundancy mitigation rules comprise at least one of: an object self-announcement redundancy mitigation rule, a frequency-based redundancy mitigation rule, a distance-based redundancy mitigation rule, a dynamics-based redundancy mitigation rule, a confidence-based redundancy mitigation rule, or an entropy-based redundancy mitigation rule.

Clause 12: An apparatus, comprising: a memory comprising executable instructions; and one or more processors configured to execute the executable instructions and cause the apparatus to perform a method in accordance with any one of Clauses 1-11.

Clause 13: An apparatus, comprising means for performing a method in accordance with any one of Clauses 1-11.

Clause 14: A non-transitory computer-readable medium comprising executable instructions that, when executed by one or more processors of an apparatus, cause the apparatus to perform a method in accordance with any one of Clauses 1-11.

Clause 15: A computer program product embodied on a computer-readable storage medium comprising code for performing a method in accordance with any one of Clauses 1-11.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2$\mu$ slots/subframe. The subcarrier spacing and symbol length/duration are a function of the numerology. The subcarrier spacing may be equal to $2^{\mu}\times15$ kHz, where is the numerology 0 to 5. As such, the numerology p=0 has a subcarrier spacing of 15 kHz and the numerology $\mu$=5 has a subcarrier spacing of 480 kHz. The symbol length/duration is inversely related to the subcarrier spacing. FIGS. 3A-3D provide an example of slot configuration 0 with 14 symbols per slot and numerology $\mu$=2 with 4 slots per subframe. The slot duration is 0.25 ms, the subcarrier spacing is 60 kHz, and the symbol duration is approximately 16.67 s.

A resource grid may be used to represent the frame structure. Each time slot includes a resource block (RB)

(also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of applying redundancy mitigation techniques when determining whether or not to transmit a sensor data sharing message on a sidelink channel in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a sidelink user equipment (UE), comprising:

observing, via one or more sensors, a set of objects in an environment in which the sidelink UE is operating;

applying one or more redundancy mitigation rules to the set of objects;

determining, from the set of objects, a number of objects to be shared with one or more other sidelink UEs after the one or more redundancy mitigation rules have been applied to the set of objects;

determining, based on the determined number of objects to be shared, whether to transmit a sensor data sharing message (SDSM) to the one or more other sidelink UEs indicating the objects to be shared from the set of objects that were observed via the one or more sensors of the sidelink UE; and taking one or more actions based on the determination of whether to transmit the SDSM.

2. The method of claim 1, wherein determining whether to transmit the SDSM is based further on a minimum number of objects threshold.

3. The method of claim 2, wherein:

determining whether to transmit the SDSM comprises determining to transmit the SDSM when the number of objects to be shared is greater than or equal to the minimum number of objects threshold, and taking the one or more actions comprises transmitting the SDSM to the one or more other sidelink UEs based on the determination to transmit the SDSM.

4. The method of claim 2, wherein:

determining whether to transmit the SDSM comprises determining not to transmit the SDSM when the number of objects to be shared is less than the minimum number of objects threshold, and taking the one or more actions comprises not transmitting the SDSM to the one or more other sidelink UEs based on the determination not to transmit the SDSM.

5. The method of claim 2, wherein the minimum number of objects threshold is at least one of:

configured in memory of the sidelink UE by a manufacturer of the sidelink UE, received by the sidelink UE from a base station, or determined by the sidelink UE based on at least one criterion.

6. The method of claim 2, wherein the minimum number of objects threshold and a periodicity for transmitting the SDSM depend on an autonomous driving reliability requirement associated information about the environment in which the sidelink UE is operating.

7. The method of claim 6, wherein:

when the autonomous driving reliability requirement is a first value, the minimum number of objects threshold is a second value and the periodicity for transmitting the SDSM is a third value, and when the autonomous driving reliability requirement is a fourth value that is less than the first value, the minimum number of objects threshold is a fifth value that is greater than the second value and the periodicity for transmitting the SDSM is a sixth value that is greater than the third value.

8. The method of claim 2, wherein determining the number of objects to be shared with one or more other sidelink UEs comprises periodically determining the number of objects to be shared with one or more other sidelink UEs within a time window.

9. The method of claim 8, further comprising:

determining that the periodically determined number of objects to be shared with the one or more other sidelink UEs is less than the minimum number of objects threshold within the time window; and increasing a periodicity for transmitting the SDSM based on the determination that the periodically determined number of objects to be shared with the one or more other sidelink UEs is below the minimum number of objects threshold within the time window.

10. The method of claim 9, wherein taking the one or more actions comprises transmitting the SDSM according to the increased periodicity.

11. The method of claim 1, wherein the one or more redundancy mitigation rules comprise at least one of:

an object self-announcement redundancy mitigation rule, a frequency-based redundancy mitigation rule, a distance-based redundancy mitigation rule, a dynamics-based redundancy mitigation rule, a confidence-based redundancy mitigation rule, or an entropy-based redundancy mitigation rule.

12. An apparatus for wireless communication, comprising:

a memory comprising executable instructions; and one or more processors configured to execute the executable instructions and cause the apparatus to:

observe, via one or more sensors, a set of objects in an environment in which the apparatus is operating;

apply one or more redundancy mitigation rules to the set of objects;

determine, from the set of objects, a number of objects to be shared with one or more sidelink UEs after the one or more redundancy mitigation rules have been applied to the set of objects;

determine, based on the determined number of objects to be shared, whether to transmit a sensor data sharing message (SDSM) to the one or more sidelink UEs indicating the objects to be shared from the set of objects that were observed via the one or more sensors of the apparatus; and take one or more actions based on the determination of whether to transmit the SDSM.

13. The apparatus of claim 12, wherein determining whether to transmit the SDSM is based further on a minimum number of objects threshold.

14. The apparatus of claim 13, wherein:

determining whether to transmit the SDSM comprises determining to transmit the SDSM when the number of objects to be shared is greater than or equal to the minimum number of objects threshold, and taking the one or more actions comprises transmitting the SDSM to the one or more sidelink UEs based on the determination to transmit the SDSM.

15. The apparatus of claim 13, wherein:

determining whether to transmit the SDSM comprises determining not to transmit the SDSM when the number of objects to be shared is less than the minimum number of objects threshold, and taking the one or more actions comprises not transmitting the SDSM to the one or more sidelink UEs based on the determination not to transmit the SDSM.

16. The apparatus of claim 13, wherein the minimum number of objects threshold is at least one of:

configured in memory of the apparatus by a manufacturer of the apparatus, received by the apparatus from a base station, or determined by the apparatus based on at least one criterion.

17. The apparatus of claim 13, wherein the minimum number of objects threshold and a periodicity for transmitting the SDSM depend on an autonomous driving reliability requirement associated information about the environment in which the apparatus is operating.

18. The apparatus of claim 17, wherein:

when the autonomous driving reliability requirement is a first value, the minimum number of objects threshold is a second value and the periodicity for transmitting the SDSM is a third value, and when the autonomous driving reliability requirement is a fourth value that is less than the first value, the minimum number of objects threshold is a fifth value that is greater than the second value and the periodicity for transmitting the SDSM is a sixth value that is greater than the third value.

19. The apparatus of claim 13, wherein determining the number of objects to be shared with one or more sidelink UEs comprises periodically determining the number of objects to be shared with one or more sidelink UEs within a time window.

20. The apparatus of claim 19, further comprising:

determining that the periodically determined number of objects to be shared with the one or more sidelink UEs is less than the minimum number of objects threshold within the time window; and increasing a periodicity for transmitting the SDSM based on the determination that the periodically determined number of objects to be shared with the one or more sidelink UEs is below the minimum number of objects threshold within the time window.

21. The apparatus of claim 20, wherein taking the one or more actions comprises transmitting the SDSM according to the increased periodicity.

22. The apparatus of claim 12, wherein the one or more redundancy mitigation rules comprise at least one of:

an object self-announcement redundancy mitigation rule, a frequency-based redundancy mitigation rule, a distance-based redundancy mitigation rule, a dynamics-based redundancy mitigation rule, a confidence-based redundancy mitigation rule, or an entropy-based redundancy mitigation rule.

23. A non-transitory computer-readable medium for wireless communication, comprising:

executable instructions that, when executed by one or more processors of an apparatus, cause the apparatus to:

observe, via one or more sensors, a set of objects in an environment in which the apparatus is operating;

apply one or more redundancy mitigation rules to the set of objects;

determine, from the set of objects, a number of objects to be shared with one or more sidelink UEs after the one or more redundancy mitigation rules have been applied to the set of objects; and determine, based on the determined number of objects to be shared, whether to transmit a sensor data sharing message (SDSM) to the one or more sidelink UEs indicating the objects to be shared from the set of objects that were observed via the one or more sensors of the apparatus; and take one or more actions based on the determination of whether to transmit the SDSM.

24. The non-transitory computer-readable medium of claim 23, wherein the executable instructions that cause the apparatus to determine whether to transmit the SDSM based further on a minimum number of objects threshold.

25. The apparatus of claim 24, wherein:

the executable instructions that cause the apparatus to determine whether to transmit the SDSM further include executable instructions that cause the apparatus to determine not to transmit the SDSM when the number of objects to be shared is less than the minimum number of objects threshold, and the executable instructions that cause the apparatus to take the one or more actions further include executable instructions that cause the apparatus to not transmit the SDSM to the one or more sidelink UEs based on the determination not to transmit the SDSM.

26. The non-transitory computer-readable medium of claim 24, wherein the minimum number of objects threshold and a periodicity for transmitting the SDSM depend on an autonomous driving reliability requirement associated information about the environment in which the apparatus is operating.

27. The non-transitory computer-readable medium of claim 24, wherein:

the executable instructions that cause the apparatus to determine the number of objects to be shared with one or more sidelink UEs further include executable instructions that cause the apparatus to periodically determine the number of objects to be shared with one or more sidelink UEs within a time window.

28. The non-transitory computer-readable medium of claim 27, wherein:

the executable instructions further include executable instructions that cause the apparatus to:

determine that the periodically determined number of objects to be shared with the one or more sidelink UEs is less than the minimum number of objects threshold within the time window, and increase a periodicity for transmitting the SDSM based on the determination that the periodically determined number of objects to be shared with the one or more sidelink UEs is below the minimum number of objects threshold within the time window, and the executable instructions that cause the apparatus to take the one or more actions further include executable instructions that cause the apparatus to transmit the SDSM according to the increased periodicity.

29. The non-transitory computer-readable medium of claim 23, wherein the one or more redundancy mitigation rules comprise at least one of:

an object self-announcement redundancy mitigation rule, a frequency-based redundancy mitigation rule, a distance-based redundancy mitigation rule, a dynamics-based redundancy mitigation rule, a confidence-based redundancy mitigation rule, or an entropy-based redundancy mitigation rule.

30. An apparatus for wireless communication, comprising:

means for observing, via one or more sensors, a set of objects in an environment in which the apparatus is operating;

means for applying one or more redundancy mitigation rules to the set of objects;

means for determining, from the set of objects, a number of objects to be shared with one or more other sidelink UEs after the one or more redundancy mitigation rules have been applied to the set of objects;

means for determining, based on the determined number of objects to be shared, whether to transmit a sensor data sharing message (SDSM) to the one or more other sidelink UEs indicating the objects to be shared from the set of objects that were observed via the one or more sensors of the sidelink UE; and means for taking one or more actions based on the determination of whether to transmit the SDSM.

* * * * *